(12) United States Patent
Tourdot et al.

(10) Patent No.: US 11,010,569 B2
(45) Date of Patent: May 18, 2021

(54) COMBINATION BARCODE READER AND RADIO FREQUENCY IDENTIFICATION READ/WRITE DEVICE

(71) Applicant: Promega Corporation, Madison, WI (US)

(72) Inventors: Matt Tourdot, Whitewater, WI (US); Brian George, McFarland, WI (US); Dillon Biermeier, Verona, WI (US); John Kuehl, McFarland, WI (US)

(73) Assignee: PROMEGA CORPORATION, Madison, WI (US)

( * ) Notice: Subject to any disclaimer, the term of this patent is extended or adjusted under 35 U.S.C. 154(b) by 0 days.

(21) Appl. No.: 16/531,952

(22) Filed: Aug. 5, 2019

(65) Prior Publication Data

US 2020/0042752 A1    Feb. 6, 2020

Related U.S. Application Data

(60) Provisional application No. 62/714,141, filed on Aug. 3, 2018.

(51) Int. Cl.
*G06K 7/00* (2006.01)
*G06K 7/10* (2006.01)

(52) U.S. Cl.
CPC ......... *G06K 7/0004* (2013.01); *G06K 7/0008* (2013.01); *G06K 7/1097* (2013.01); *G06K 7/10237* (2013.01)

(58) Field of Classification Search
CPC ............... B25J 13/086; F25D 2700/08; G06K 19/0718; G06K 7/082; B60G 2400/1042; B60G 2400/1062

USPC ................ 235/440, 439, 435, 375
See application file for complete search history.

(56) References Cited

U.S. PATENT DOCUMENTS

| | | | | |
|---|---|---|---|---|
| 8,570,157 | B1* | 10/2013 | Diorio | G06K 7/10108 340/10.1 |
| 2005/0218219 | A1* | 10/2005 | Sano | G06K 1/22 235/383 |
| 2007/0126578 | A1* | 6/2007 | Broussard | G06Q 10/087 340/572.1 |
| 2007/0188306 | A1* | 8/2007 | Tethrake | G06K 5/00 340/10.51 |

(Continued)

FOREIGN PATENT DOCUMENTS

| | | |
|---|---|---|
| EP | 1587019 A2 | 10/2005 |
| WO | 2004/100098 A1 | 11/2004 |

OTHER PUBLICATIONS

PCT, Notification of Transmittal of the International Search Report and the Written Opinion of the International Searching Authority, or the Declaration, in International Application No. PCT/US2019037308, dated Oct. 9, 2019 (10 pages).

*Primary Examiner* — Edwyn Labaze
(74) *Attorney, Agent, or Firm* — McAndrews, Held & Malloy, Ltd.

(57) ABSTRACT

A system includes a processor, a barcode reader, and an RFID R/W component. The barcode reader scans a barcode of an item to generate barcode information, and communicates the barcode information to the processor. The RFID R/W component receives, from the processor, a serialization number corresponding to the barcode information. The RFID R/W component then writes the serialization number to an RFID tag of the item.

20 Claims, 2 Drawing Sheets

(56) References Cited

U.S. PATENT DOCUMENTS

| | | | |
|---|---|---|---|
| 2011/0236981 A1* | 9/2011 | Wakamiya | G01N 35/00732 436/52 |
| 2016/0180132 A1 | 6/2016 | Lim | |
| 2017/0193444 A1* | 7/2017 | Dearing | G06K 7/10861 |
| 2018/0295513 A1* | 10/2018 | Embree | H04B 5/0056 |

* cited by examiner

COMBINATION BARCODE READER AND RADIO FREQUENCY IDENTIFICATION READ/WRITE DEVICE

CROSS-REFERENCE TO RELATED APPLICATIONS

The present application claims benefit from and priority to U.S. Application No. 62/714,141, filed Aug. 3, 2018. The above-identified application is incorporated by reference herein in its entirety.

BACKGROUND

The process of implementing an RFID inventory system for products already located in the field may be relatively labor intensive and be impacted by human error. The process of serializing RFID tags with a specific product serial number (e.g., a unique serial number) may be performed relatively easily during product manufacturing process, but, once products are in the field, performing serialization may become a somewhat manual and cumbersome process. As understood herein, a "serial number" need not be limited to numerals, but may include other alpha-numeric characters or symbols, or other types of information.

An overview of an exemplary known process for manual serialization of an RFID tag for an associated product in the field may be as follows. First, the product barcode number may be scanned by a barcode reader and then stored in memory. Then the barcode number may be reformatted into an Electronic Product Code format (EPC). Next, an RFID read/write device may be used to capture the existing EPC code of a new RFID tag, which is also stored in memory as the target tag. Then the reformatted barcode number may be entered in the RFID R/W device interface. The RFID R/W device may then be triggered to write the reformatted barcode number to replace the target EPC tag number. Finally, the RFID R/W device may then read the RFID tag again to validate that the EPC number has been correctly programmed. When each step is manually executed, this can be a time-consuming process and there are many ways in which this process could break down. At any step, a number may be transposed or entered incorrectly resulting in inconsistent data.

SUMMARY

According to certain inventive techniques, a system comprises: a processing component that executes an application; a barcode reader component configured to scan a barcode of an item to generate barcode information and communicate the barcode information to the processing component; an RFID R/W component configured to receive, from the processing component, a serialization number corresponding to the barcode information and write the serialization number to an RFID tag of the item. The RFID R/W component may read the RFID tag after writing it to verify that the serialization number has been correctly written to the RFID tag. The system of claim may further comprise an item receiver configured to receive the item, wherein the item receiver may have a window through which the barcode reader is configured to scan the barcode of the item when the item is located in the item receiver. The RFID R/W component may have a near-field antenna. The serialization number may include an EPC. The barcode reader component may provide audible feedback indicating a code has been captured. The barcode may have formats comprising at least one of retail, supply chain, and 2D codes. The RFID R/W component may employ an adjustable RF power level.

According to certain inventive techniques, a method for operating a system including a barcode reader, an RFID R/W component, and an application includes: scanning, with the barcode reader, a barcode of an item to generate barcode information; receiving, by the application, the barcode information; responsively generating, by the application, a serialization number; receiving, by the RFID R/W component, the serialization number; and writing, with the RFID R/W component, the serialization number to an RFID tag of the item. The RFID R/W component may further be used to verify that the serialization number has been correctly written to the RFID tag. An item receiver may receive the item before the scanning step. The item receiver may have a window through which the barcode reader scans the barcode of the item when the item is located in the item receiver. The RFID R/W component may include a near-field antenna. The serialization number may include an EPC. The method may be performed automatically without user intervention. The barcode reader component may provide audible feedback indicating a code has been captured. The barcode reader component may read a plurality of barcode formats, including at least one of retail, supply chain, or 2D codes. The RFID R/W component may employ an adjustable RF power level.

Figure 1:
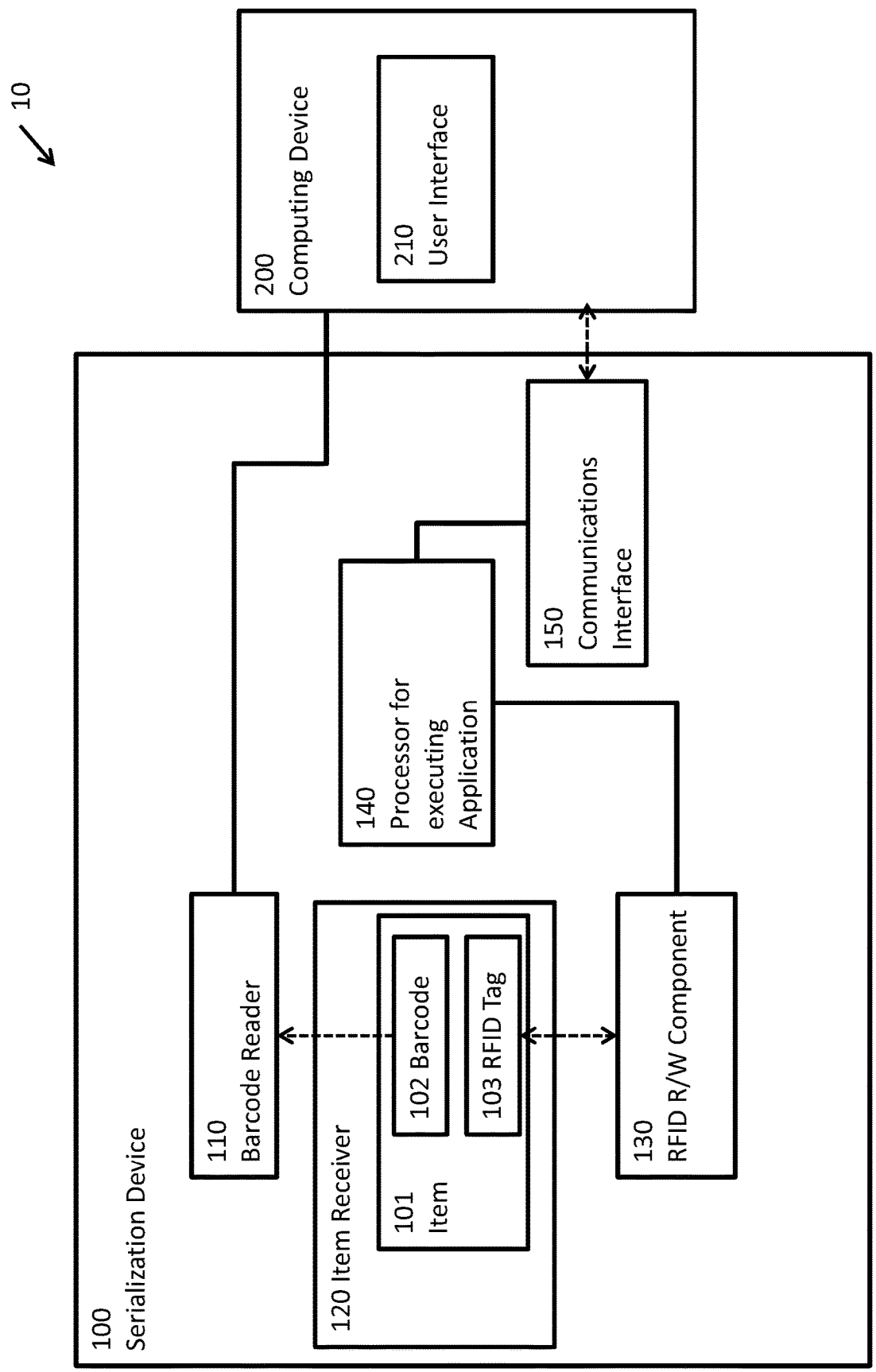
FIG. 1 illustrates a system 10 for programming serialization numbers to RFID tags 103, according to certain inventive techniques.

The foregoing summary, as well as the following detailed description of certain techniques of the present application, will be better understood when read in conjunction with the appended drawings. For the purposes of illustration, certain techniques are shown in the drawings. It should be understood, however, that the claims are not limited to the arrangements and instrumentality shown in the attached drawings.

DETAILED DESCRIPTION

Turning to FIG. 1, an exemplary, non-limiting inventive RFID serialization system 10 may include several components: (1) a computing device 200 including a user interface 220; (2) a barcode reader 110; (3) an RFID R/W component 130; and (4) a processor 140 (e.g., one or more processors operating in coordination) executing a software application (or, more simply, an "application"), which is in communication (via communications interface 150) with the computing device 200 and may control both the barcode reader 110 and the RFID R/W device 130. Optionally, the application may be executed by computing device 200.

A housing may substantially house the barcode reader 110, the RFID R/W component 130, and the processor 140. The processor 140 may execute the application and, through appropriate interfaces (e.g., communications interface 150), may communicate (e.g., through wired, wireless medium(s)) with the computing device 200 (for example, to operate in conjunction with the user interface 210). The application may be installed in memory on the serialization device 100 or on a computing device 200 located apart from to the serialization device 100. According to some techniques, the application and/or corresponding user interface 220 may be on/in the same device that includes the barcode reader 110, the RFID R/W component 130, and the processor 140 (e.g., the serialization device 100).

As will be further explained, the design disclosed herein may enable the following: only the relevant barcode 102 (the one on a targeted item 101) may be scanned by the barcode reader 110, thereby reducing the occurrence of human error and improving accuracy; there may be no need to manually enter EPC or similar numbers to write the item's RFID tag 102; and an RFID tag 103 read/write zone may be contained to the vicinity where the item 101 is placed so there is only one RFID tag 103 visible to the RFID R/W component 130.

Turning to FIG. 1, a serialization device 100 may include a processor 140, a barcode reader 110, an RFID R/W component 130, a communication interface 150, and an item receiver 120. The serialization device 100 may also include a battery (e.g., rechargeable battery) and/or a power port to receive electrical energy (not shown). These power sources may provide operational power to the components on the serialization device 100 and optionally recharge the battery through battery recharging hardware (not shown).

The item receiver 120 may be configured to receive an item 101. A barcode 102 and/or RFID tag 103 may be integrated with a label for the item 101 and attached to the item 101. The item receiver 120 may be designed such that the item 101 may only be placed in a way that allows the barcode 102 to be correctly captured.

The item receiver 120 may include a window (not shown) through which the barcode 102 is viewable. The barcode reader 120 may be positioned underneath or adjacent to the item receiver 120. The barcode reader 110 may scan the barcode 102, for example, through the window or opening in the item receiver 120. The RFID R/W component 130 may include an antenna (e.g., UHF antenna) that communicates with the RFID tag 103. The RFID R/W component 130 may be able to read and/or write the RFID tag 103. The antenna for the RFID R/W component 130 may be located underneath the item receiver 120 that receives the item 101. For example, the antenna may be integrated with the item receiver 120. The remainder of the RFID R/W component 130 may be located near or in a location separate from the antenna. The RFID R/W component 130 may employ an adjustable RF power level to fine-tune its operation. The barcode reader 110 may be integrated into the enclosure such that the item's barcode 102 is visible to the scanner of the barcode reader 110. The barcode reader 110 may provide audible and/or visual feedback indicating a code encoded in the barcode 102 has been successfully captured. The code may be in a variety of different possible formats, including retail, supply chain, and 2D codes. The barcode reader 110 may be triggered by the application. As another option, the barcode reader 110 may be triggered automatically when an item 101 enters the item receiver 120 area (for example, based on sensor data from a proximity sensor that senses the presence of item 101). The RFID R/W component 130 may be integrated into the serialization device such that only the RFID tag 103 of the item 101 to be serialized is "visible" to the RFID R/W component 130.

The communications interface 150 may facilitate communications with the computing device 200 that provides the user interface 210. The communications interface 150 may support wired (e.g., USB or Ethernet) or wireless (e.g., WiFi, Bluetooth, cellular) modalities. The processor 140 may communicate with computing device 200 and the user interface 201 via the communications interface 150.

The application control the barcode reader 110 and/or the RFID R/W component 130. If the application is being executed by computing device 200, the processor 140 may relay scanned data, status messages, error codes, to the computing device 200.

Figure 2:
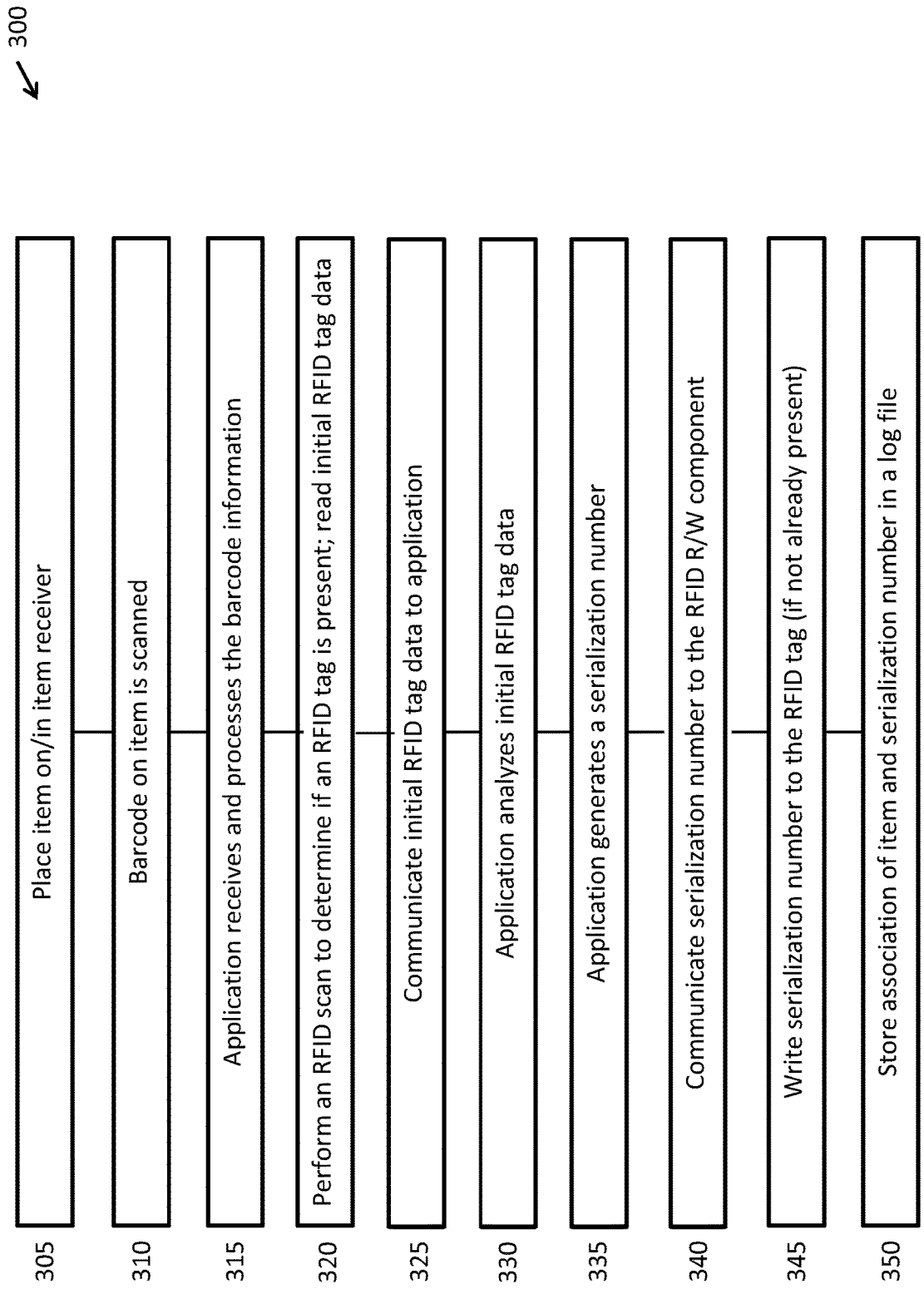
FIG. 2 illustrates a flowchart for a method of operating system 10, according to certain inventive techniques.

Turning to FIG. 2, a flowchart 300 for operating a system (such as system 10) is illustrated. All steps need not be implemented. Additional steps may be employed. Steps may be performed in different orders as applicable and makes sense. Some steps may be performed completely or partially in parallel.

At step 305, a user may place an item 101 on/in the item receiver 120. Optionally, the user may be prompted to place the item 101 on/in the item receiver 120 by the application through the user interface 210 (or by an indicator on/in serialization device 100). The user may then confirm that the item 101 is in place. The barcode scanner 110 or another sensing component (capacitive, optical, etc.) may be used to determine if item 101 has been properly placed on/in the item receiver 120. The item receiver 120 may receive the item 101 in a way that causes the item 101 to have a specific orientation with respect to the barcode scanner 110. According to the orientation of the item 101, the barcode scanner 110 may only be able to scan the barcode of interest 102.

At step 310, the barcode 102 on the item 101 is scanned by the barcode scanner 110. Again, the item 101 may be oriented with respect to the barcode scanner 110 such that only the barcode of interest 102 is visible to the barcode scanner 110. The barcode scanner 110 may automatically scan the barcode 102 if a presence of the item 101 is sensed (for example, by another sensing component (capacitive, optical, etc.)). At step 315, the processor 140 executing the application receives the scanned barcode information, and processes the barcode information.

At step 320, RFID scanning may occur with or without prompting from the application or the user. For example, the RFID R/W component 130 may be persistently scanning in an area of the item receiver 120 to determine if an RFID tag 103 is present, or the RFID R/W component 130 may scan only in response to instruction by the user via application or processor 140. If the item 101 is present, but an RFID tag 103 is not detected, then the user may be prompted (via the user interface 210 or through another interface, for example, located on/in serialization device 100) to put an RFID tag 103 on the item 101. If an RFID tag 103 is present, data stored in the RFID tag 103 may be read by the RFID R/W component 130. If no RFID tag 103 is detected, then this status may be communicated to the user, for example, through the user interface 210 or through some other indicator, for example, on/in the serialization device 100.

At step 325, the initial RFID tag data may be conveyed to the processor 140 for processing by the application. According to one technique, the RFID tag data is automatically read and conveyed to the application without additional user interaction. As another option, user interaction (either through the user interface 210 or through another type of interface on/in serialization device 100) may be required after the RFID tag 103 is detected to cause the RFID tag data to be actually read and/or communicated to the application.

At step 330, the application may analyze the initial RFID tag data to determine whether the data includes a serialization number (e.g., EPC), and if so, whether it matches an appropriate serial number mask. The serial number mask may be based on a regular expression that is optionally entered as a mask for acceptable barcode format(s). If the serialization number is appropriate, then the user may be prompted (e.g., through user interface 210 or otherwise) to return the item to stock. In some cases, the reading of the RFID tag 103 may result in an invalid reading, in which case the user may be prompted to rescan the RFID tag 103. If an invalid serialization number is determined (e.g., the serialization number does not comport with the regular expression serial number mask), then the application may prompt the user via user interface 210 to actuate a barcode scan using the barcode reader 110 (e.g., through a "scan" icon or button in the user interface 210). Alternatively, the application may cause the barcode reader 110 to automatically scan the barcode 102 of the item 101.

At step 335, the application may then evaluate the barcode information and responsively generate an appropriate serialization number (e.g. EPC code). At step 340, the serialization number is communicated to the RFID R/W component 130. At step 345, the RFID R/W component 130 writes the serialization number to the RFID tag 103. The write operation may then be verified by reading the RFID tag 103 using the RFID R/W component 130. The application may control this operation. If the RFID tag 103 has been successfully programmed, the application through the user interface 210 may instruct the user to stock the item 101 (or some other indicator could instruct the user to stock the item 101).

At step 350, a log of the read/write operation (including the serialization number) may be stored in a database. For example, an association of the item's encoded barcode information and the EPC written to the RFID tag 103 may be stored in a database, such as a remote database (for example located on a cloud). Log files may be stored in memory on the serialization device 100. Each user 'session' may be saved as a discrete log file. The log files may be uploaded (e.g., using the user interface 210 and/or communication interface 150) to an external computer.

The process of reading the barcode, evaluating the barcode and responsively generating a serialization number, writing the serialization number to the RFID tag, and verifying the write operation was successful may be performed partially or entirely automatically without user intervention.

According to certain inventive techniques, the system 10 may be used for a "tag association" process. In this case, rather than the serialization device 100 rewriting the RFID tag 103 with the product serialization number, the scanned RFID tag data is left as default, and the application 210 creates a data linkage between the scanned barcode information and the information in the RFID tag 103. This data list may then be queued for transmission to the master database.

According to certain inventive techniques, the RFID read/write area may be contained to a relatively well-defined field in contrast to a handheld RFID reader. This may promote that only the target RFID tag 103 may be "visible" (i.e., accurately detectable) to the RFID R/W component 130, and only the target RFID tag 103 is encoded with the correct information. For example, a near-field antenna, which has a limited read range, may promote targeted, error-reduced reading. Shielding may also be used inside the enclosure to further reduce cross-reading of adjacent tags. This method prevents incorrect data. Furthermore, the item receiver 120 may be configured to only accommodate a specific item size and/or align the required barcode 102, thereby excluding non-target items from the process.

The device may also collocate the barcode reader and RFID reader so both operations may be performed automatically without user interaction. The process and method may also be automated so no human interaction needed, which reduces errors. For example, logic may be used which requires both a barcode and the RFID tag serialization number to be visible/present simultaneously. When the preset requirements are met the programming process can be automated.

The serialization device may also be field-deployable, e.g., the serialization device may be deployed to the item location rather than the item having to go back to the manufacturing facility to be tagged/coded.

The present devices and/or methods may be realized in hardware, software, or a combination of hardware and software. The present methods and/or systems may be realized in a centralized fashion in at least one computing system, processors, and/or other logic circuits, or in a distributed fashion where different elements are spread across several interconnected computing systems, processors, and/or other logic circuits. Any kind of computing system or other apparatus adapted for carrying out the methods described herein is suited. The processor 140, for example, and/or a processor on the computing device 200 may be associated with a memory that stores a program or other code that, when being loaded and executed, controls the serialization device 100 and/or computing device 200 such that it carries out the methods described herein. Another possible implementation may comprise an application specific integrated circuit or chip such as field programmable gate arrays (FPGAs), a programmable logic device (PLD) or complex programmable logic device (CPLD), and/or a system-on-a-chip (SoC). Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine readable medium" is defined to include all types of machine readable storage media and to exclude propagating signals.

It will be understood by those skilled in the art that various changes may be made and equivalents may be substituted without departing from the scope of the novel techniques disclosed in this application. In addition, many modifications may be made to adapt a particular situation or material to the teachings of the novel techniques without departing from its scope. Therefore, it is intended that the novel techniques not be limited to the particular techniques disclosed, but that they will include all techniques falling within the scope of the appended claims.

The invention claimed is:

1. A system comprising:
 a barcode reader component configured to:
  scan a barcode of an item to generate barcode information; and
  communicate the barcode information;
 a processing component configured to:
  receive the barcode information from the barcode reader component; and
  evaluate the barcode information and responsively generate a serialization number corresponding to the barcode information; and
  communicate the serialization number; and
 a radio-frequency identification (RFID) read/write (R/W) component configured to:
  receive, from the processing component, the serialization number; and
  write the serialization number to an RFID tag on the item.

2. The system of claim 1, further comprising an item receiver configured to receive the item.

3. The system of claim 2, wherein the item receiver comprises a window through which the barcode reader is configured to scan the barcode of the item when the item is located in the item receiver.

4. The system of claim 3, wherein, when the item is located in the item receiver, only a barcode of interest is visible to the barcode reader.

5. The system of claim 1, wherein the RFID R/W component comprises a near-field antenna.

6. The system of claim 1, wherein the serialization number comprises an EPC.

7. The system of claim 1, wherein the barcode reader component is configured to provide audible feedback indicating a code has been captured.

8. The system of claim 1, wherein the barcode includes formats comprising at least one of retail, supply chain, and 2D codes.

9. The system of claim 1, wherein the RFID R/W component employs an adjustable RF power level.

10. A method for operating a system including a barcode reader, an RFID R/W component, and a processor configured to execute a software application, the method comprising:
scanning, with the barcode reader, a barcode of an item to generate barcode information;
communicating, by the barcode reader, the barcode information;
receiving, by the processor from the barcode reader, the barcode information;
evaluating, by the software application, the barcode information;
in response to said evaluating, responsively generating, by the application, a serialization number corresponding to the barcode information;
communicating, by the processor, the serialization number;
receiving, by the RFID R/W component from the processor, the serialization number; and
writing, with the RFID R/W component, the serialization number to an RFID tag of the item.

11. The method of claim 10, further comprising verifying, using the RFID R/W component, that the serialization number has been written to the RFID tag of the item.

12. The method of claim 10, wherein an item receiver is configured to receive the item before the scanning step.

13. The method of claim 12, wherein the item receiver comprises a window through which the barcode reader scans the barcode of the item when the item is located in the item receiver.

14. The method of claim 13, wherein, when the item is located in the item receiver, only a barcode of interest is visible to the barcode reader.

15. The method of claim 10, wherein the RFID R/W component comprises a near-field antenna.

16. The method of claim 10, wherein the serialization number comprises an EPC.

17. The method of claim 10, wherein the method is performed automatically without user intervention.

18. The method of claim 10, wherein the barcode reader component provides at least one of audible or visible feedback indicating a code has been captured.

19. The method of claim 10, wherein the barcode reader component is configured to read a plurality of barcode formats, including at least one of retail, supply chain, or 2D codes.

20. The method of claim 10, wherein the RFID R/W component employs an adjustable RF power level.

* * * * *